United States Patent
Hannant et al.

(10) Patent No.: US 11,074,614 B2
(45) Date of Patent: Jul. 27, 2021

(54) GPS MAPPING OF OUTDOOR ADVERTISEMENT

(71) Applicant: DH Capital, LLC, Woodinville, WA (US)

(72) Inventors: David Hannant, Woodinville, WA (US); Jesse DeGroff, Woodinville, WA (US); Damon Streetman, Highland, UT (US)

(73) Assignee: DH Capital, LLC, Woodinville, WA (US)

( * ) Notice: Subject to any disclaimer, the term of this patent is extended or adjusted under 35 U.S.C. 154(b) by 504 days.

(21) Appl. No.: 15/699,762

(22) Filed: Sep. 8, 2017

(65) Prior Publication Data

US 2018/0075486 A1 Mar. 15, 2018

Related U.S. Application Data

(60) Provisional application No. 62/385,852, filed on Sep. 9, 2016.

(51) Int. Cl.
| | | |
|---|---|---|
| *G06Q 30/00* | (2012.01) | |
| *G06Q 30/02* | (2012.01) | |
| *G06F 16/58* | (2019.01) | |
| *G06F 16/9537* | (2019.01) | |

(52) U.S. Cl.
CPC ..... *G06Q 30/0261* (2013.01); *G06F 16/5866* (2019.01); *G06F 16/9537* (2019.01); *G06Q 30/0256* (2013.01); *G06Q 30/0267* (2013.01)

(58) Field of Classification Search
CPC .......... G06Q 30/0241; G06Q 30/0256; G06Q 30/0261; G06Q 30/0267

USPC ......................................................... 705/14
See application file for complete search history.

(56) References Cited

U.S. PATENT DOCUMENTS

| | | | |
|---|---|---|---|
| 10,037,343 B1* | 7/2018 | Ellenby | G06F 16/9537 |
| 2006/0248763 A1* | 11/2006 | Tarabella | G09F 21/04 |
| | | | 40/590 |
| 2007/0147280 A1* | 6/2007 | Ashmore | H04W 4/20 |
| | | | 370/320 |
| 2007/0214041 A1* | 9/2007 | Patel | G06Q 30/0261 |
| | | | 705/14.55 |

(Continued)

OTHER PUBLICATIONS

Golber, Richard, A New Approach to City Signage, Public Works, 1999 (Year: 1999).*

*Primary Examiner* — Matthew L Hamilton
(74) *Attorney, Agent, or Firm* — Seed IP Law Group, LLP

(57) ABSTRACT

Embodiments are directed to a system that enables a user of a mobile communication device to view information that is presented on a billboard at a time after the user sees the physical billboard. The user inputs a billboard-information request into the mobile communication device, such as via an application executing on the mobile communication device. A current location of the mobile communication device at the time when the user input the billboard-information request is determined. Each billboard that is within a predetermined distance from the current location is identified as being a billboard-of-interest for the user. Information associated with each billboard-of-interest is provided to the user via the application executing on the mobile communication device or via a map on a website that is accessible to the user.

17 Claims, 8 Drawing Sheets

(56) References Cited

U.S. PATENT DOCUMENTS

| | | | | |
|---|---|---|---|---|
| 2009/0149199 A1* | 6/2009 | Maghoul | ................ | G06Q 30/02 |
| | | | | 455/456.3 |
| 2014/0085179 A1* | 3/2014 | Krig | ....................... | G06Q 30/06 |
| | | | | 345/156 |
| 2014/0164125 A1* | 6/2014 | Taylor | ................ | G06Q 30/0267 |
| | | | | 705/14.58 |
| 2014/0358685 A1* | 12/2014 | Want | ................... | G06Q 30/0261 |
| | | | | 705/14.58 |
| 2015/0254720 A1* | 9/2015 | Newberg | ........... | G06Q 30/0261 |
| | | | | 705/14.63 |
| 2015/0294347 A1* | 10/2015 | Placide | .............. | G06Q 30/0242 |
| | | | | 705/14.41 |
| 2015/0363830 A1* | 12/2015 | Abuelsaad | ......... | G06Q 30/0266 |
| | | | | 705/14.63 |
| 2016/0155150 A1* | 6/2016 | Zhang | ................ | G06Q 30/0261 |
| | | | | 705/14.58 |
| 2017/0213240 A1* | 7/2017 | Waldron | ................ | H04W 4/023 |
| 2019/0042845 A1* | 2/2019 | Perkins | ............... | G06F 16/9537 |
| 2019/0179976 A1* | 6/2019 | Stroila | .................... | G01C 21/30 |
| 2020/0402099 A1* | 12/2020 | Pittman | .............. | G06Q 30/0269 |

* cited by examiner

GPS MAPPING OF OUTDOOR ADVERTISEMENT

BACKGROUND

Technical Field

The present disclosure relates generally to providing advertisement information to people, and more particularly, but not exclusively, to utilizing a currently location of a mobile communication device to determine a billboard-of-interest for the user of the mobile communication device and to provide information associated with the billboard-of-interest to the user of the mobile communication device.

Description of the Related Art

Billboards have long been used on roads and highways as a way to present information to people in automobiles. Billboards can include very little information, such as a name of a store or restaurant, or they can present a lot of information, such as a date and location of an event and a phone number to call for tickets to the event. However, traveling at 100 kilometers per hour past a billboard presents many challenges. For example, many people may not be able to read fast enough to obtain all the information on the billboard, while other people may have a difficult time remembering the information on the billboard. It would be beneficial for the driver to write down the information from the billboard, but that could result in a very hazardous situation for everyone on the road. It is with respect to these and other considerations that the embodiments herein have been conceived.

BRIEF SUMMARY

Various embodiments disclosed herein are directed to a system that enables a user of a mobile communication device to view information that is presented on a billboard, e.g., outdoor advertisement, such that the user can view the information at a later time after the user has left the physical billboard.

In some embodiments, when the user is in the proximity of and sees a billboard of interest, the user inputs a billboard-information request into the mobile communication device, such as via an application executing on the mobile communication device. A current location of the mobile communication device at the time when the user input the billboard-information request is determined. Each billboard that is within a predetermined or user-selected distance from the current location is identified as being a billboard-of-interest for the user. Information associated with each billboard-of-interest is provided to the user as a billboard tracking report.

In some situations, the user may pass a number of billboards while the user is driving down a road. One or more of these billboards may create a high interest in the user for further viewing. To be safe while driving or to save time, however, the user may decide to not input a billboard-information request while driving by or looking at each billboard-of-interest. Accordingly, in some embodiments, the mobile communication device stores a GPS tracking record of the mobile communication device's location over time, such as while the user travels along the road. At a later point in time, such as when the user is at a stop light or when the user arrives at his or her destination, the user inputs the billboard-information request to obtain the billboard tracking report. Using the GPS tracking data, a route that the user has travel for a predetermined amount of time or for a predetermined distance or since the last billboard tracking report was provided to the user is determined. This route is matched to a particular road and the billboards located along that road, in both directions of travel, are identified as billboards-of-interest for the billboard tracking report.

The billboard tracking report is provided to the user via the application executing on the mobile communication device or via a website that is accessible to the user, for example, either from the mobile communication device or from another computing device. The billboard tracking report provides various types of information related to the billboards-of-interest, such as the information that is currently being presented on the billboard, an identity of the owner of the information presented on the billboard, links to the owner's website, or other information related to the billboard.

In some embodiments, a list of each billboard-of-interest and its corresponding information is presented to the user. In other embodiments, a map is presented to the user with icons representing the location of each billboard-of-interest (e.g., each billboard along the user's route of travel), along with the direction the billboard was facing. The user can then select an icon to receive additional information associated with the billboard to confirm whether that is the particular billboard that interested the user. For example, after the icon is selected, the entire billboard, as it was displayed along the roadside is provided to the user via the application on the user's mobile communication device or via a website. From this display, the user can review the billboard, select the billboard to highlight, enlarge or link to additional information, select to purchase the product or service displayed on the billboard, or perform other actions associated with the information on the billboard.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, the drawings include.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

The term "billboard" refers to physical signs or objects that present information to people. Billboards as used herein include outdoor signs that advertise goods or services to people that encounter or travel past them. But billboards can also include indoor signs or signs that present other types of information, such as health awareness information, information on missing persons, information on wanted criminals, voting information, or other types of information that may be of interest to the public. Billboards can be stationary, such as a sign next to a highway, or they may be mobile, such as advertisement poster on the side of a bus.

Figure 1A:
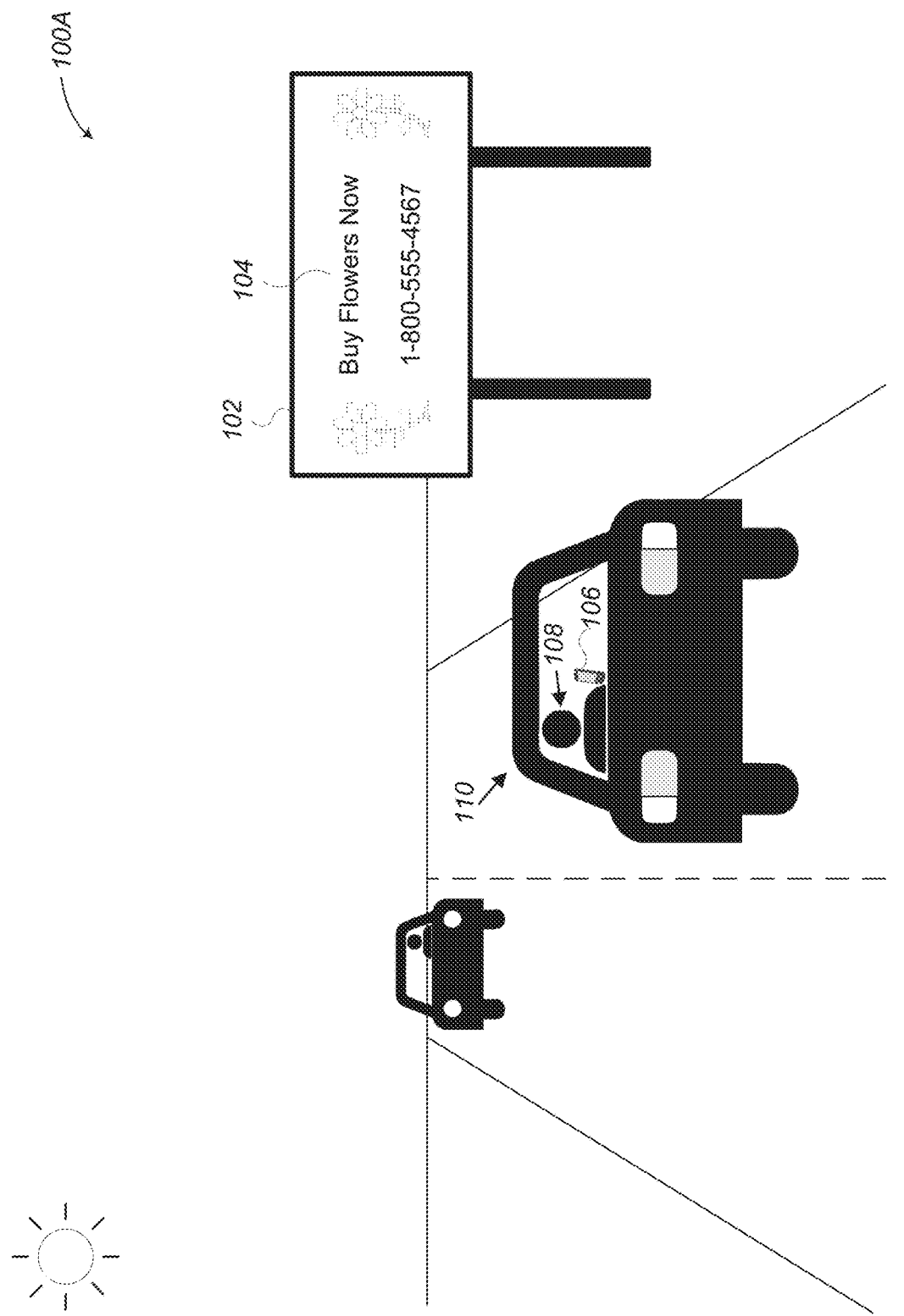
FIGS. 1A-1B illustrate example environments for providing billboard information to a user of a mobile communication device in accordance with embodiments described herein.
Figure 1B:
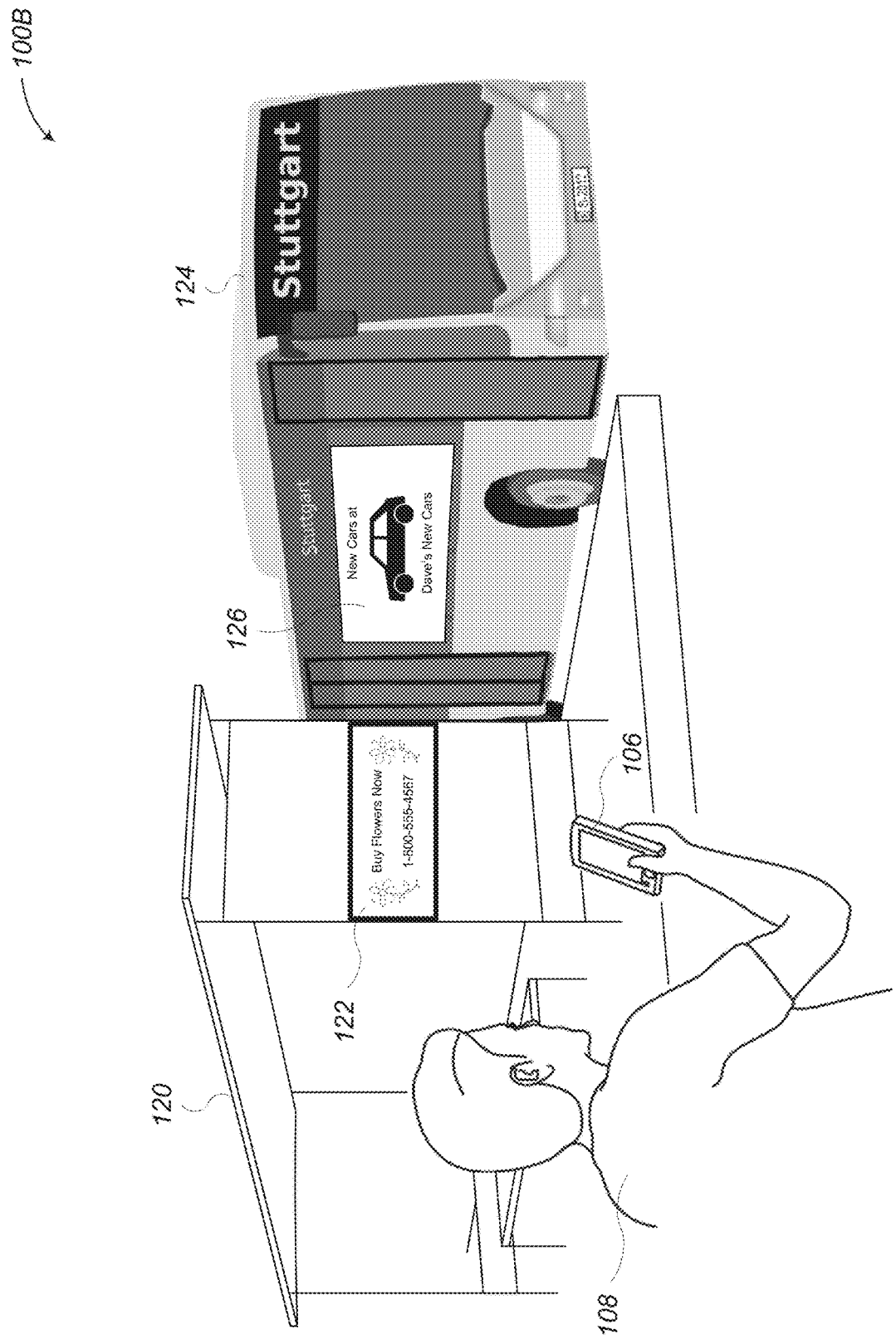

FIGS. 1A-1B illustrate example environments for providing billboard information to a user of a mobile communication device in accordance with embodiments described herein. Example 100A in FIG. 1A includes a user 108 and a billboard 102. The billboard 102 presents information 104 to people as they travel past the billboard 102 in a vehicle 110. The user 108 may be the driver or a passenger in the vehicle 110.

In order to ensure driving safety, the driver of the vehicle 110 may not have time to focus on the billboard 102. The driver might be able to glance at the billboard 102 and only see a portion of the information 104 before refocusing his attention back on the road. Similarly, a passenger in the vehicle 110 may not able to view all the information 104 on the billboard 102 due to the speed of the vehicle 110 or the amount of information presented on the billboard. Accordingly, the user 108 may not take any action on the information 104 presented on the billboard 102, which provides no benefit to the user 108 or to the billboard owner or renter.

Moreover, some states and cities have passed laws restricting the size, number, and location of billboards for the express purpose of avoiding distractions for drivers in order to improve the safety on the roads. Similarly, more and more states are restricting the use of electronic devices by drivers, which increases vehicle safety by reducing the driver's ability to use their mobile phone to research the information presented on the billboards. Accordingly, it is desired to ensure that drivers are not distracted by billboards, while also balancing the desires of the owners or renters of the billboards to reap the benefits from drivers and passengers reading and taking action on the presented information on the billboard, such as purchasing the products or services advertised on the billboard.

The user 108, whether the driver or a passenger, may wish to later review the details of the information 104 on the billboard 102. The user may also wish to capture the information 104 from the billboard 102 without having to write it down or memorize it. As illustrated, the billboard 102 is on the side of a highway and the user 108 is in a car driving down the highway. It should be understood that the user can be either the driver or a passenger of the vehicle 110, and the vehicle 110 can be a bus, a train, a boat, an airplane on a taxiway, or any other vehicle, or the user may not be in a vehicle, but may be instead walking past the billboard 102. Additionally, the billboard 102 may be a stationary sign located by any roadway, lake, river, bus stop, stadium, building side, or other location where information is presented to people as they travel past the billboard 102, or the billboard 102 may be a mobile sign located in or on the side of a bus, train, boat, airplane, taxicab, semi truck, or other vehicle.

As the user 108 passes the billboard 102, the user 108 sees some of the information 104 that is presented on the billboard 102. The user 108 may wish to see the information 104 in more detail at a later time or other location for a variety of different reasons, such as to read everything on the billboard, to act on the information presented on the billboard, etc. Accordingly, the user 108 can input, as they pass the billboard, a billboard-information request to the user's mobile communication device 106. The billboard-information request is an indication that the user 108 is interested in the information that is presented on a billboard that is located at or near (e.g., within a predetermine or user-selected distance) the then current location of the user 108 and wants to obtain a billboard tracking report with information regarding those billboards.

The user 108 can input the billboard-information request via a variety of different mechanisms. For example, in some embodiments, the user 108 may input the billboard-information request via an application executing on the mobile communication device 106, such as discussed below in conjunction with FIGS. 2A-2B. In at least one embodiment, the application includes a button that the user activates to record the user's interest in a billboard, i.e., input the billboard-information request. In other embodiments, the application may be voice activated so that the user 108 can input the billboard-information request by speaking into a microphone on the mobile communication device 106, which provides a hands-free mechanism for the user to indicate an interest in the billboard.

As described in more detail herein, the mobile communication device 106 determines a current location of the mobile communication device 106 when the user 108 inputs the billboard-information request into the mobile communication device 106. For example, the GPS unit of the mobile communication device 106 is utilized to determine the current location of the mobile communication device 106. In some embodiments, the multiple GPS coordinates may be obtained in a small amount of time (e.g., 2-10 seconds) to determine a direction of travel of the user 108.

The billboard 102 is then identified from a list of billboards based on a comparison of the location of the mobile communication device 106 and the locations of known billboards. In some embodiments, the direction of the mobile communication device 106 is utilized to identify those billboards that are facing the user at the time when the user input the billboard-information request.

The information 104 of the billboard 102 is then provided to the user 108. In some embodiments, information from other billboards in the vicinity (e.g., a predetermined or user-selected distance) of the mobile communication device 106 location when the user 108 inputs the billboard-information request may also be presented to the user 108.

As described herein, the information 104 may be provided to the user in a variety of different ways. Briefly, for example, an application executing on the mobile communication device 106 may maintain a list of billboards and their information, which can be presented to the user in response to the billboard-information request. In another example, the user 108 may receive an email with the information 104. In yet another example, the user 108 may receive an email with one or more links that direct the user 108 to a website associated with the information 104, e.g., a website of a company that paid for the information 104 to be presented on the billboard 102. In still another example, the user 108 may receive an email with a link to a billboard website that presents a map to the user with the billboards that are near the location of the mobile communication device 106. From this map, the user 108 can select the correct billboard that they are interested in, and the map can include links to the website associated with the information presented on the billboard.

The mobile communication device 106 can be a cell phone, mobile phone, smart phone, tablet computer, portable personal computer, automobile head unit, or other mobile electronic communication device.

As mentioned above, billboards can be stationary or mobile billboards. While example 100A in FIG. 1A illustrated a stationary billboard 102 on the side of a road, example 100B in FIG. 1B illustrates a stationary billboard 122 at a bus stop 120 and a mobile billboard 126 on a bus 124. In this illustrative example, the user 108 is standing on the street, but in other situations (not shown) the user 108 may be sitting at the bus stop, sitting in the bus, sitting in another vehicle, looking out of a window of a nearby shop, or some other location near the billboards 122 and 126.

Similar to what is described above in conjunction with FIG. 1A, when the user 108 sees one or both of the billboards 122 and 126, the user 108 inputs a billboard-information request to the user's mobile communication device 106. The billboard-information request is an indication that the user 108 is interested in the information that is presented on billboard 122, billboard 126, or both. By employing embodiments described herein, information regarding the billboards 122 and 126 is provided to the user 108.

In some embodiments, the location of the bus 124 is tracked over time, such as by using GPS sensors on the bus 124. Similarly, the time at which the user inputs the billboard-information request is stored with the location of the mobile communication device 106. In this way, the location and the corresponding timestamp of the mobile communication device 106 (when the user input the billboard-information request) are compared to the bus's location over time to identify the particular bus 124 and its corresponding billboard 126 that were at the user's location when they input the billboard-information request. In some other embodiments, the system may not track the exact location of individual buses over time. In such an embodiment, the system can utilize bus routes and schedules to identify one or more buses that travel along a route near the location of the mobile communication device and provide the user with a list of billboards on those buses. Accordingly, the user can receive or search for bus billboards that are near bus stop 120.

In some other embodiments, the mobile communication device 106 can display augmented reality information to the user based on the billboard information of billboards identified using the location of the mobile communication device 106. For example, the user can take a picture or video of the bus stop 120. By employing embodiments described herein, billboard information associated with the billboard 122 at the bus stop 120 is identified and provided to the user. The image of the bus stop 120 may be augmented by adding a coupon or other information associated with the billboard 122 to the image.

It should be recognized the above examples of billboards and billboard information is for illustrative purposes and should not be considered exhaustive or limiting.

Figure 2A:
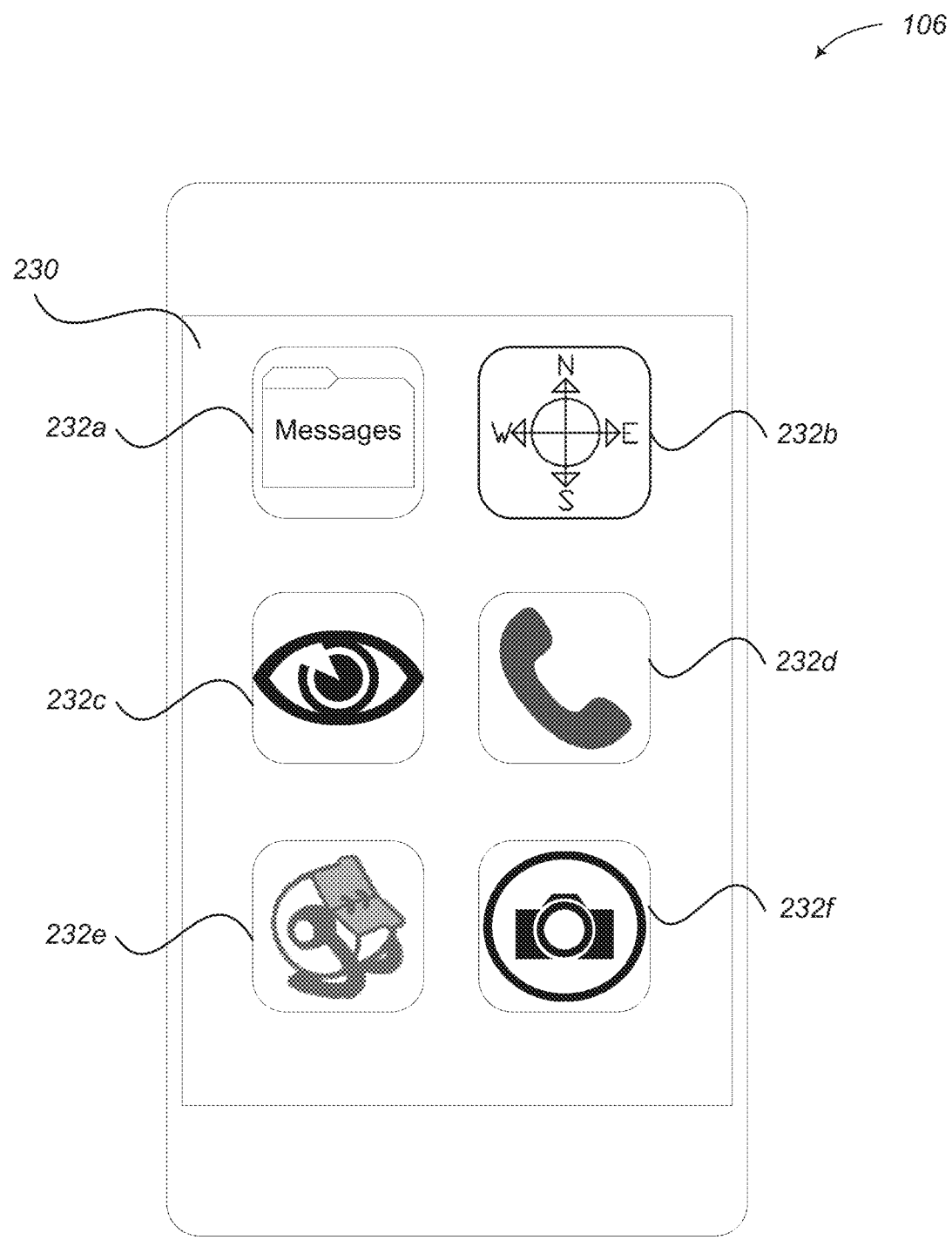
FIGS. 2A-2B show various use case examples of a mobile application to input a billboard-information request and to receive associated billboard information in accordance with embodiments described herein.
Figure 2B:
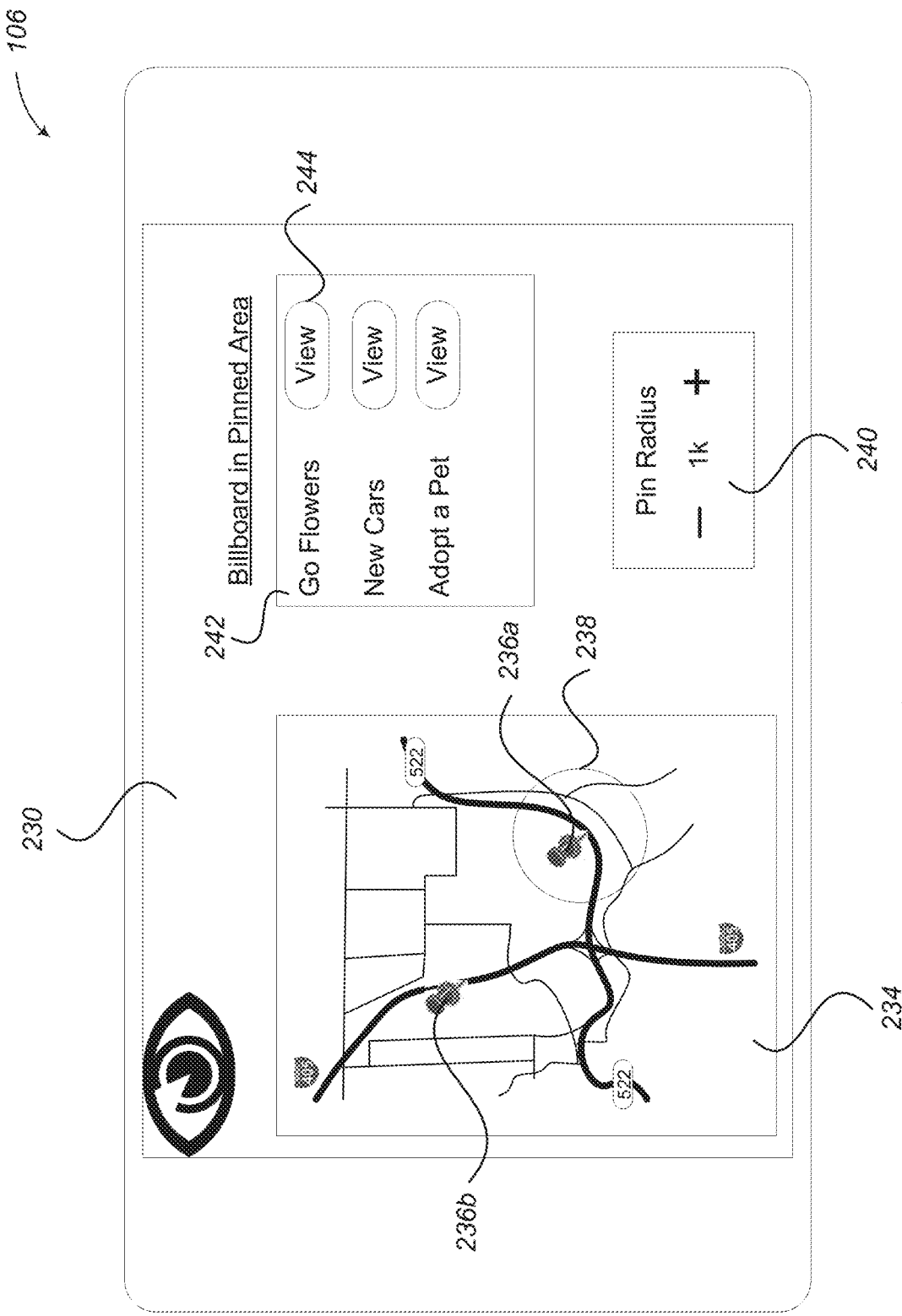

FIGS. 2A-2B show various use case examples of a mobile application to input a billboard-information request and to receive associated billboard information in accordance with embodiments described herein. FIG. 2A shows one example of mobile communication device 106, which includes a display area 230. The display area 230 may display a plurality of icons 232a-232f to the user. Each icon may be an interface to access a different mobile application, such as a messaging application 232a, a map application 232b, a phone application 232d, a contacts application 232e, and a camera application 232f.

As mentioned elsewhere herein, a mobile application executing on the mobile communication device 106 may be used to input a billboard-information request and to view associated billboard information. The mobile application may include or be part of or executed by billboard-information-request module 206, and optionally mapping module 310, billboard-identification module 208, and billboard database 312, described in more detail below in conjunction with FIG. 3.

In the example illustrated in FIG. 2A, the display area 230 includes icon 232c as the interface to such a mobile application. In some embodiments, the user can input a billboard-information request by tapping on icon 232c. In other embodiments, the use can open the application by clicking on the icon 232c and interact with the application to input the billboard-information request.

Once the billboard-information request is input to the application, the application then accesses or communicates with the mobile communication device 106 GPS unit to obtain the current location of the mobile communication device 106 on the Earth. The mobile communication device 106 can store this location for further processing by the mobile communication device 106, or it may send it to a server for further processing by the server, as described in more detail below in conjunction with FIG. 3. In some other embodiments, the application may be running in the background such that it is tracking the user's location over time, as described elsewhere herein.

After the user has input one or more billboard-information requests, the user can access additional features and interfaces of the application to view the billboard information. FIG. 2B shows a use case example of the user interface of the mobile application executing on the mobile communication device 106, which presents billboard information to the user. For example, by clicking on the icon 232c in FIG. 1A, the application opens another interface, an example of which is illustrated in FIG. 2B. In this example, the display area 230 of the mobile communication device 106 includes map 234, radius adjustment interface 240, and pinned area information 242.

The map 234 includes pins 236a-236b to represent the location of the mobile communication device 106 when the user input a billboard-information request. The user can select one of the pins 236a-236b to view billboard information associated with billboards that are physically located near those corresponding locations. For example, the user can select pin 236a to view billboard information associated with billboards within radius 238. The radius 238 may be predetermined or selected by the user via the radius adjustment interface 240.

Once a pin 236a-236b is selected, the pinned area information 242 includes a list of those billboards that are in the radius of the selected pin. In various embodiments, the list of billboards in the pinned radius 238 may be ranked by distance from the selected pin 236a, based on user preferences, based on an amount paid by the billboard owner or render, based on the direction the billboard faces, or some other user or billboard characteristics.

From list of billboards in the pinned area information 242, the user can select a billboard, e.g., by selecting button 244, to view the corresponding billboard information or other information associated with the billboard (e.g., links to a website for the billboard information, coupons associated with the product or service displayed by the billboard, etc.). In some embodiments, another viewing window or interface may be opened to display the billboard information. Likewise, the use can interact with the billboard information to perform other actions, such as purchasing an associated product or service, accessing a related website, etc.

Although the billboards in in the selected radius 238 are shown in pinned area information 242, embodiments are not so limited. For example, in some embodiments, icons or scaled versions of the billboards in the radius 238 may be added to the map 234. The user can then select an icon to receive additional information associated with that billboard. Similarly, the map may display or highlight the user's route in the map 234, and the pinned area information 242 may lists those billboards along that route.

It should be recognized the above mobile application examples are for illustrative purposes and should not be considered exhaustive or limiting.

Figure 3:
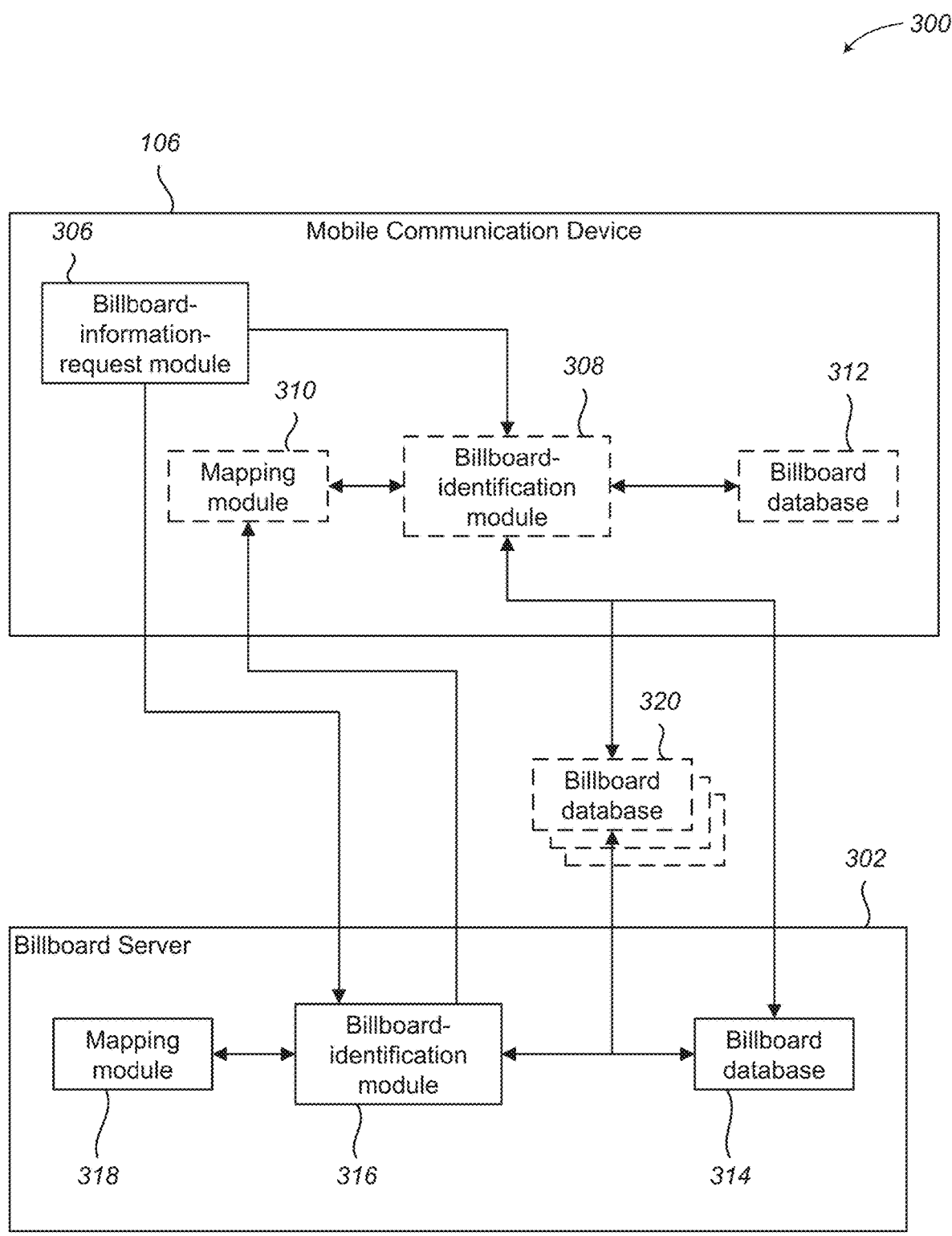
FIG. 3 is a diagram of one non-limiting embodiment of a system for providing billboard information to a user of a mobile communication device in accordance with embodiments described herein.

FIG. 3 is a diagram of one non-limiting embodiment of a system for providing billboard information to a user of a mobile communication device in accordance with embodiments described herein. System 300 includes a mobile communication device 106 and a billboard server 302.

The mobile communication device 106 includes a billboard-information-request module 306, and in some embodiments, a billboard identification module 308, a mapping module 310, and a billboard database 312. These modules and databases may be included in or executed to perform the actions of the mobile application described herein. In various embodiments, the billboard identification module 308, the mapping module 310, and the billboard database 312 may be optional and may not be included with or utilized by the mobile communication device 106. The functionality of these components will be discussed in more detail below.

The billboard-information-request module 306 enables a user, such as user 108 in FIG. 1, to input a billboard-information request indicating the user's interest in a billboard. The billboard-information request is a request for a billboard tracking report that includes various information about billboards near the user. In some embodiments, the billboard-information-request module 306 provides an interface to the user, which the user can interact with to input the billboard-information request. In some embodiments, this interface is a graphical user interface with a button that the user can activate to input the billboard-information request and indicate it is interested in a billboard. In other embodiments, the interface may be an audio interface that enables the user to input the billboard-information request via a microphone and voice recognition technologies. This type of interface can provide additional hand-free operation of the mobile communication device 106 to provide the desired functionality described herein.

In various embodiments, the billboard-information-request module 306 determines a current location of the mobile communication device 106 at the time when the user inputs the billboard-information request. In at least one embodiment, the billboard-information-request module 306 accesses the GPS functionality of the mobile communication device 106 to obtain the current location of the mobile communication device 106. The billboard-information-request module 306 may store the determined location of the mobile communication device 106 each time the user inputs the billboard-interest request, whether through activation of a graphical-user-interface button (e.g., as discussed in FIGS. 2A-2B) or an audio input. Namely, the user may indicate interest in a various different billboards as they drive along the road and the billboard-information-request module 306 will track each entry and highlight these billboards has being of high interest to the user.

In some other embodiments, the billboard-information-request module 306 tracks the location of the mobile communication device 106 over a predetermined timeframe or over a predetermined distance. In this way, the user can input the billboard-interest request when the user stops moving, even if the user is several kilometers past the billboard that they are interested in. For example, a driver of a car may be traveling down the highway and see a billboard that interests him. However, it may be unsafe for the driver access their phone and input the billboard-information request. As a result, the mobile communication device tracks the mobile communication device's route so that when the driver stops the car and it is safe for him to use the mobile communication device and input the billboard-information request, the current location of the mobile communication device and the tracked route can be used to determine the billboard that the user was interested in and the information presented on that billboard can be provided to the user, as described herein.

Once the location, or tracked location, of the mobile communication device 106 is determined, the mobile communication device 106 provides the determined location to the billboard server 302. The billboard server 302 includes a billboard database 314, a billboard identification module 316, and a mapping module 318.

The billboard database 314 includes a list of a plurality of different billboards and their physical location. In some embodiments, the billboard database 314 may be maintained by the billboard server 302, such that the information associated with the plurality of billboards and their locations is provided by the billboard owners or renters. In other embodiments, a plurality of remote billboard databases 320 that are provided by third parties and are separate from the billboard server 302.

Each billboard entry in the billboard database 314 or the remote billboard databases 320 also includes information associated with the corresponding billboard, such as the information currently being presented by the billboard, website or other information associated with the owner of the information presented on the billboard, additional information that is not being presented on the billboard but that is related to the information presented on the billboard, or other information associated with the billboard.

The billboard identification module 316 receives the location of the mobile communication device 106 and queries the billboard database 314 for one or more billboards that are at or near the location of the mobile communication device 106. In some embodiments, the billboard-identification module 316 includes an application program interface to access the various billboard databases, including each of the remote billboard databases 320.

In some embodiments, the results of the database query may be referend to as the billboards-of-interest to the user because they are close to where the user indicated that there is a billboard in which the user is interested, i.e., a billboard where the user input the billboard-information request. In at least one embodiment, the billboards-of-interest may be billboards that are within a predetermined distance from the location of the mobile communication device 106. If the location of the mobile communication device 106 includes a tracked location, the billboards-of-interest are those billboards that are along the tracked route of the mobile communication device 106. For example, assuming the tracked location includes the previous 10 kilometer route traveled by the user, the billboard identification module 316 queries the billboard database 314 for each billboard that is along, such as within a few meters of, that 10 kilometer route.

Since billboards can be on either side of the road and facing one or multiple directions, the orientation of the billboard may also be stored in the billboard database 314. In many instances, the user 108 will be a passenger who is looking the other direction and sees a billboard facing the opposite way the vehicle is being driving. The user can specify whether they are provided the billboard information for billboards facing the direction they are traveling or any billboard at the location of the mobile communication device 106, regardless of its orientation. The system can then provide the direction that each billboard is facing as an indication on the icon presented to the user, as described herein, so the user can select the icon based on both the route and the direction the billboard is facing.

The billboard identification module 316 then provides the identity of the billboards-of-interest or their corresponding information to the user of the mobile communication device 106, such as in a billboard tracking report. In some embodiments, the billboard identification module 316 sends an email message, text message, or other type of electronic message to the user of the mobile communication device 106 indicating that one or more billboards-of-interest have been identified. In at least one embodiment, the message includes an image or text of the billboards-of-interest and their corresponding information. For example, the message may include a picture of the billboard, the text of the information presented on the billboard, a link to the website of the owner of the information on the billboard, or the like. In other embodiments, the message may include a link to a website that provides a map to the user illustrating the location of the billboards-of-interest. This information can be embedded in an email, text message, Instagram posting, snapchat, or other type of presentation.

As one example, the billboard 102 might have an ad to buy flowers. Along with being presented the information on the billboard, the billboard-identification module 316, or the mapping module 318, presents an icon that the user can select to buy the flowers. The user 108 can press the icon and the flowers will be immediately purchased. A memory in the mobile communication device 106 will have stored therein the name, address, and, in many instances, credit card information and other purchase information. The user 108 can therefore confirm with their mobile communication device 106 that the flowers are to be delivered to their home, for example on Mother's Day, and that the credit card on file in the phone is to be used. Similarly, the user 108 may already have an account with the flower store or have an application executing on their mobile communication device 106 for the flower store. In this instance, the application or the user's account can be accessed via the billboard icon on the mobile communication device 106 to purchase the flowers. The user can therefore, with high confidence and in a short amount of time, obtain further information about the product on the billboard and with little to no additional effort, visit the website of the company, study the product, or even purchase the product as advertised.

The mapping module 318 receives the billboard-of-interest from the billboard identification module 316 and provides information associated with the billboards-of-interest to the user. In some embodiments, the mapping module 318 provides a website that is accessible to the user of the mobile communication device 106. In various embodiments, the website includes a map indicating the determined location of the mobile communication device 106 and the location of the identified billboards-of-interest. In some embodiments, the tracked location of the mobile communication device 106 may also be illustrated on the map along with the billboards-of-interest that are determined to be on the tracked route. In various embodiments, the mapping module 318 enables the user to interact with the map to determine in which billboard they saw and were actually interested. For example, the map may provide dots or other markers indicating where a billboard-of-interest is located. If the user selects one of these markers, then the mapping module 318 obtains the information associated with that selected billboard, e.g., by querying the billboard database 314 or receiving the information from the billboard identification module 316. In other embodiments, pictures or images of the billboards may be used instead of generic markers, which can allow the user to see what information is presented on the billboards-of-interest without having to select each billboard.

In some other embodiments, selection of a billboards-of-interest from the map may open a new browser window or redirect the user to the website of the owner of the information presented on the billboard. For example, if the information presented on the billboard is for a flower shop, such as illustrated in FIG. 1, selection of the billboard from the map may route the user to the flower shop's website, or it may initiate a phone call to the flower shop. It should be understood that the user may be enabled to select each billboard location on the map, and in response to such a selection, provide the information presented by the corresponding billboard to the user. In this way, the user can find the billboard information that interested them when they saw the physical billboard.

In some embodiments, the mobile communication device 106 may determine the billboards-of-interest and provide the corresponding billboard information to the user independent of the billboard server 302. In at least one such embodiment, the mobile communication device 106 includes the billboard identification module 308, the mapping module 310, and the billboard database 312. The billboards database 312 may employ embodiments similar to the billboard database 314 on the billboard server, but where the billboard database 312 is stored local on the mobile communication device 106. The billboard database 312 may be updated periodically, at predetermined times, or when billboard information changes with updated billboard data, which may include changes in billboard locations or modifications to the information presented on a billboard. In such an embodiment, the mobile communication device 106 may obtain this updated billboard data from a remote database, such as the billboard database 314 on the billboard server 302.

The billboard identification module 308 may employ embodiments similar to the billboard identification module 316 on the billboard server 302. In at least one such embodiment, the billboard identification module 308 may query the billboard database 312, if it is stored locally, or it may query the billboard database 314 on the billboard server 302, to determine the billboards-of-interest.

The mapping module 310 may employ embodiments similar to the mapping module 318 on the billboard server 302. In some embodiments, the mapping module 310 communicates with the billboard identification module 308 to receive the billboards-of-interest for the user. In other embodiments, the mapping module 310 may receive the billboards-of-interest from the billboard identification module 316 on the billboard server 302.

In one non-exhaustive example, the mobile communication device includes an application that includes the billboard-information-request module 306 and the mapping module 310. The user inputs the billboard-information request into the billboard-information-request module 306 of the application, which determines the current location of the mobile communication device 106. The mobile communication device 106 provides the determined location to the billboard identification module 316 on the billboard server 302. The billboard identification module 316 queries the billboard database 314 for the billboards-of-interest and their corresponding information. The billboard identification module 316 then provides the billboards of-interest and their corresponding information to the mapping module 310 of the application executing on the mobile communication device 106. The application then provides a map to the user of the mobile communication device 106 with the billboards-of-interest and their corresponding information.

The billboard-information-request module 306, the billboard identification module 308, and the mapping module 310 may be part of one or more applications executing on the mobile communication device 106. Accordingly, the billboard-information-request module 306, the billboard identification module 308, and the mapping module 310 may be a single application or any combination of separate applications.

The operation of certain aspects will now be described with respect to FIGS. 4 and 5. In at least one of various embodiments, processes 400 and 500 described in conjunction with FIGS. 4 and 5, respectively, may be implemented by or executed on one or more computing devices, such as mobile communication device 106, billboard server 302, or a combination thereof.

Figure 4:
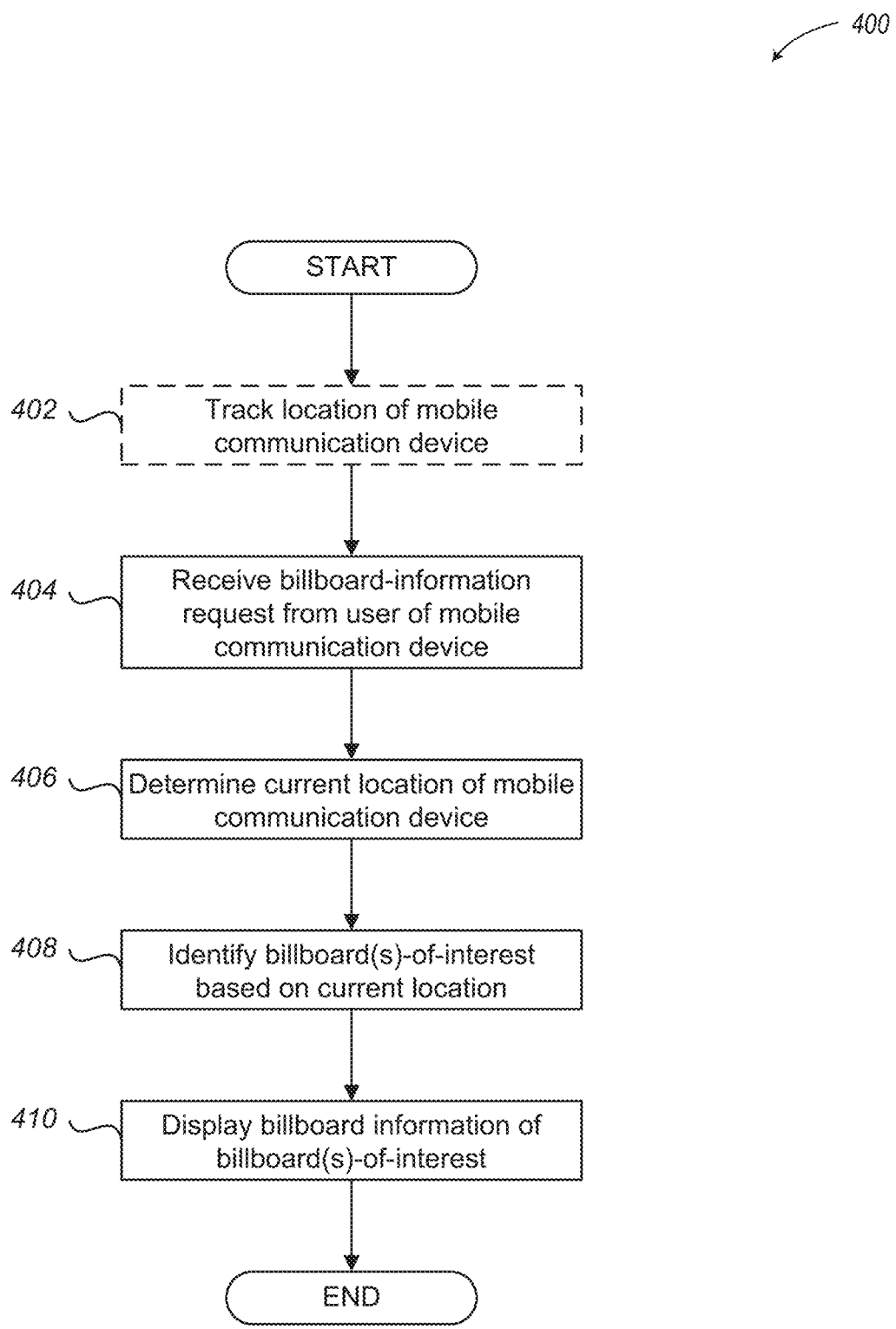
FIG. 4 illustrates a logical flow diagram generally showing one embodiment of an overview process for providing billboard information to a user based on the user's current location in accordance with embodiments described herein.

FIG. 4 illustrates a logical flow diagram generally showing one embodiment of an overview process 400 for providing billboard information to a user based on the user's current location in accordance with embodiments described herein. Process 400 begins, after a start block, at block 402, where a location of the user's mobile communication device is tracked. In some embodiments, the location of the mobile communication device may be tracked for a predetermined period of time or for a predetermined distance. In at least one embodiment, the tracked location may be continuously updated such that the mobile communication device maintains the tracked location for the previous predetermined minutes or the previous predetermined distance. In various embodiments, block 402 may be optional and may not be performed.

Process 400 proceeds to block 404, where a billboard-information request is received from the user of the mobile communication device. This billboard-information request is an input from the user indicating that the user is interested in a billboard at the user's current location or along the user's tracked route. As described above, the user may input this request via a graphical user interface, such as by activating a button, or via an audio interface, such as by voicing a command into a microphone on the mobile communication device.

Process 400 continues at block 406, where a current location of the mobile communication device is determined. This current location is the physical location of the mobile communication device on the earth at the time the user input the billboard-information request, such as by using GPS coordinates. If the location of the mobile communication device has been tracked, this determined location may be the location of the mobile communication device over a previous predetermined distance or a previous predetermined time period. In some embodiments, the mobile communication device may obtain two or more GPS coordinates to determine which direction the user is traveling, which is be used to obtain billboards-of-interest that are facing the user as they are moving.

Process 400 proceeds next to block 408, where one or more billboards-of-interest are identified based on the current location of the mobile communication device. In various embodiments, a billboard database is queried to determine which billboards are located at or adjacent to, e.g., within a predetermined distance of, the current location of the mobile communication device, or along the tracked route of the mobile communication device.

Process 400 continues next at block 410, where billboard information associated with the one or more billboards-of-interest is displayed to the user of the mobile communication device as a billboard tracking report. As described elsewhere herein, this information may be displayed to the user via an application executing on the mobile communication device, such as in a map or other list of information, via an electronic message, via a website, or via some other electronic means of communicating billboard information to the user of the mobile communication device.

After block 410, process 400 terminates or returns to a calling process to perform other actions.

Figure 5:
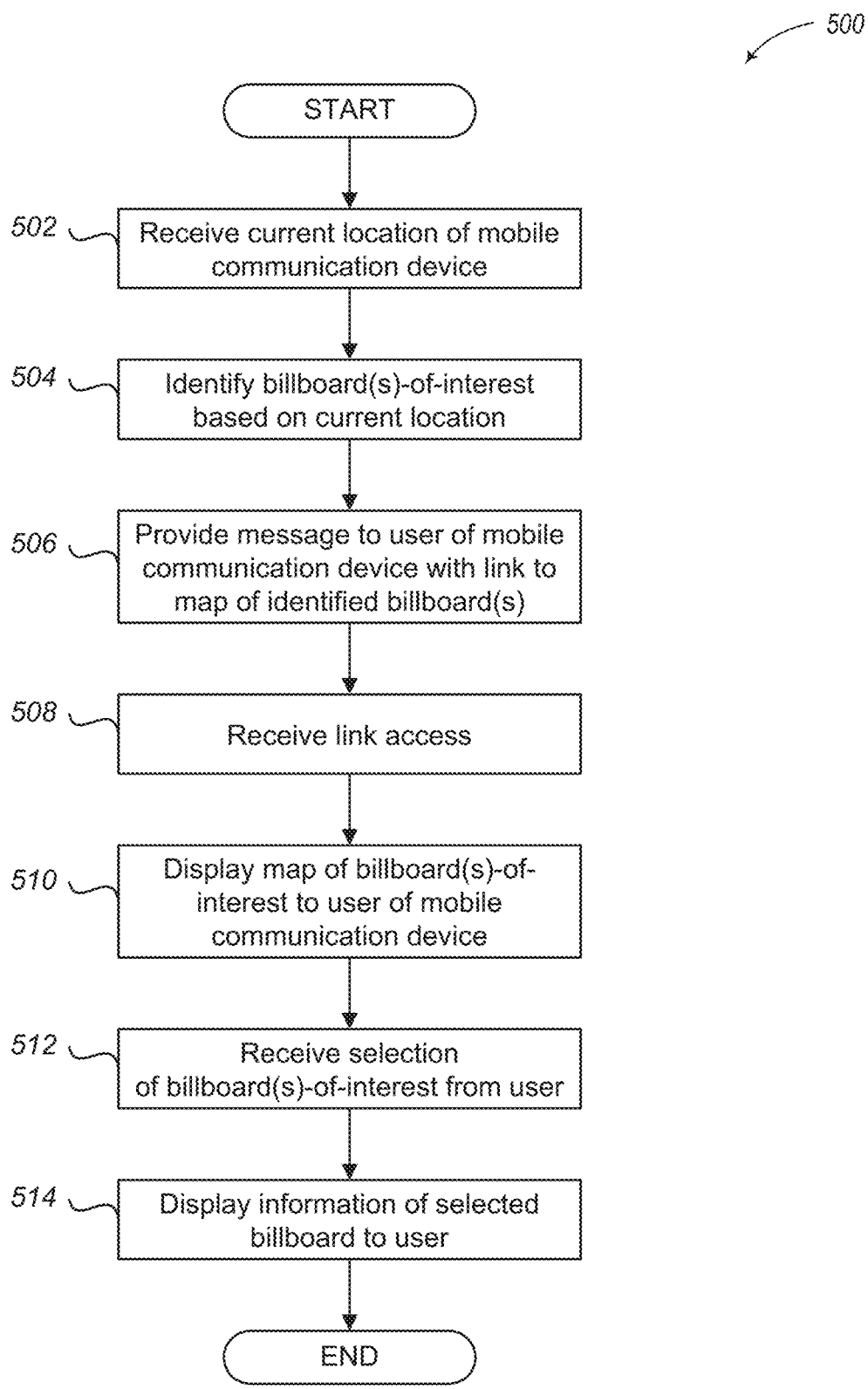
FIG. 5 illustrates a logical flow diagram generally showing one embodiment of a process for identifying billboards-of-interest based on the user's current location and enabling the user to access a map with information associated with the billboards-of-interest in accordance with embodiments described herein.

FIG. 5 illustrates a logical flow diagram generally showing one embodiment of a process 500 for identifying billboards based on the user's current location and enabling the user to access a map with information associated with the identified billboards in accordance with embodiments described herein.

Process 500 begins, after a start block, at block 502, where a current location of a mobile communication device is received. In various embodiments, a billboard server may receive the current location, or the tracked location, from the mobile communication device after the mobile communication device has determined the current location of the mobile communication device, such as described above in conjunction with blocks 402, 404, and 406 in FIG. 4.

Process 500 proceeds to block 504, where one or more billboards-of-interest are identified based on the current location. In various embodiments, block 504 may employ embodiments similar to what is described in conjunction with block 408 in FIG. 4 to query a database for billboards that are located near the current location of the mobile communication device.

Process 500 continues at block 506, where a message is provided to the user of the mobile communication device. The message may be an email message, a text message, an alert or message in an application executing on the mobile communication device, or some other electronic message. The message may include a link to a map identifying the billboards-of-interest. The message may also include other information, such as the information presented by the billboards-of-interest, links to the websites of the owners of the information presented on the billboards-of-interest, maps or pictures of the billboards of interest, or other information associated with the billboards-of-interest.

Process 500 proceeds next to block 508, where an indication is received that the user accessed the link in the message. In various embodiments, the link is to a website where the user can view various different kinds of information associated with the billboards-of-interest.

Process 500 continues next at block 510, where a map is displayed to the user. As indicated above, the link accessed by the user may be to a website that provides information associated with the billboards-of-interest. In at least one embodiment, the website displays a map of the current location of the mobile communication device. Again, this is the location of the mobile communication device when the user of the mobile communication provided an input the billboard-information request indicating that there was a billboard in which the user was an interested. The map may include an icon, marker, or image of each billboard-of-interest at their corresponding location on the map.

Process 500 proceeds to block 512, where a selection of one of the billboards-of-interest is received. In various embodiments, the user may be enabled to click on the billboards-of-interest identified on the map.

In response to a selection of one of the billboards-of-interest, process 500 flows to block 514, where information associated with the selected billboard is displayed to the user. In various embodiments, this information includes the information presented on the billboard. In other embodiments, this information may include information about the owner of the information presented on the billboard, which may include a link to the owners website or other information.

After block 514, process 500 terminates or returns to a calling process to perform other actions.

Figure 6:
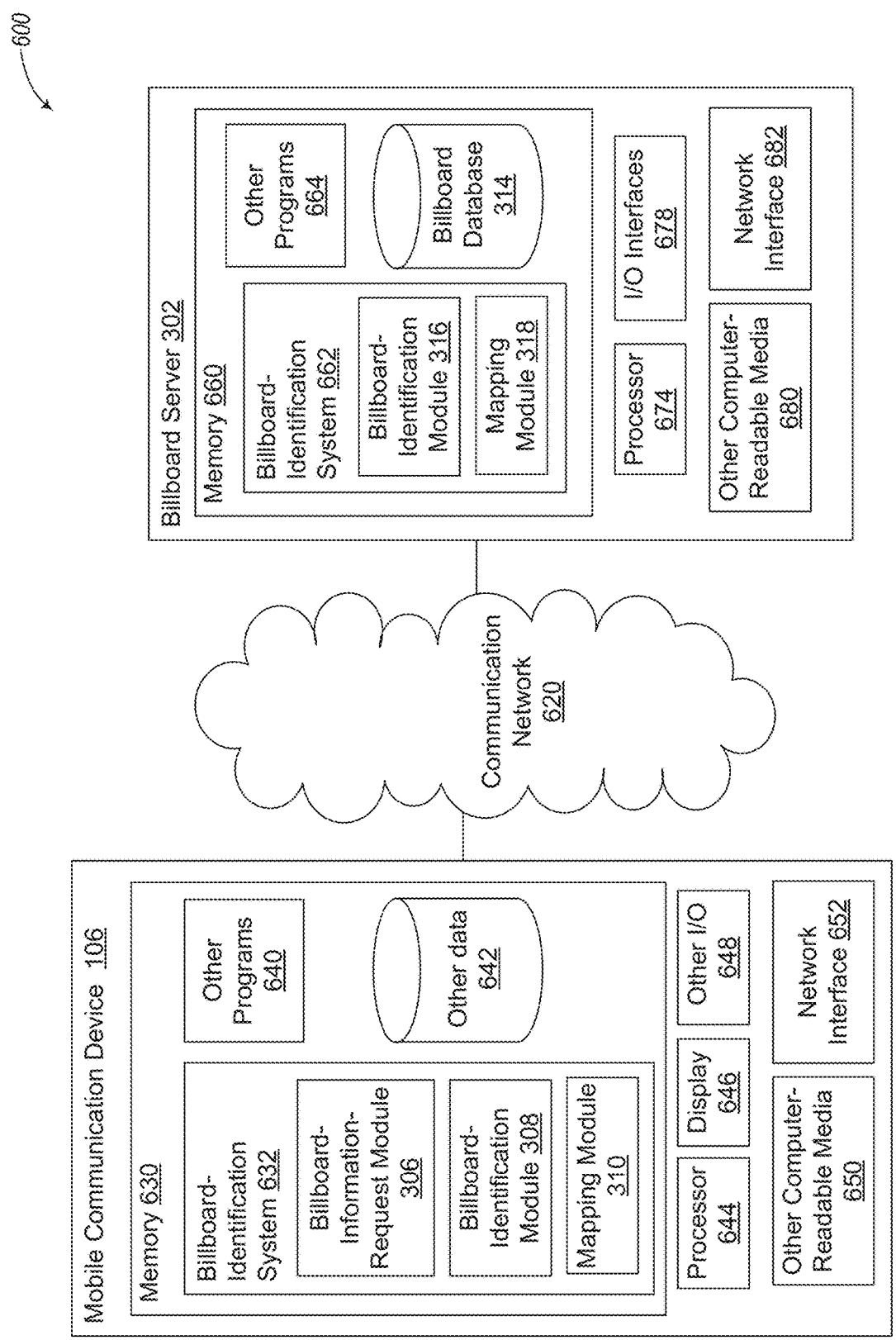
FIG. 6 shows a system diagram that describes one implementation of computing systems for implementing embodiments described herein.

FIG. 6 shows a system diagram that describes one implementation of computing systems for implementing embodiments described herein. System 600 includes mobile communication device 106 and billboard server 302.

One or more special-purpose computing systems are used to implement mobile communication device 106 to enable a user to input a billboard-information request and, at a later time, view information associated with a billboard located at the location where the mobile communication device was when the request was input by the user, as described herein. Accordingly, various embodiments described herein may be implemented in software, hardware, firmware, or in some combination thereof. The mobile communication device 106 includes memory 630, processor 644, display 646, other I/O interfaces 648, other computer-readable media 650, and network interface 652.

Process 644 includes one or more processing devices that execute instructions to perform actions, including at least some embodiments, described herein. In various embodiments, the processor 644 may include one or more central processing units (CPUs).

Memory 630 may include one or more various types of non-volatile and/or volatile storage technologies. Examples of memory 630 include, but are not limited to, flash memory, hard disk drives, optical drives, solid-state drives, various types of random access memory (RAM), various types of read-only memory (ROM), other computer-readable storage media (also referred to as processor-readable storage media), or other memory technologies, or any combination thereof. Memory 630 may be utilized to store information, including computer-readable instructions that are utilized by processor 644 to perform actions, including at least some embodiments described herein.

Memory 630 may have stored thereon billboard identification system 632, which includes billboard-information-request module 306, and in some embodiments, billboard identification module 308 or mapping module 310. The billboard-information-request module 306 enables a user to input a billboard-information request and determine a current location of the mobile communication device 106 at the time when the request is input into the billboard-information-request module 306, as described in more detail herein. The billboard-identification module 308 utilizes the location of the mobile communication device to identify one or more billboards-of-interest that are within a predetermined distance from the mobile communication device's location. The mapping module 310 provides a map or other interface to the user with information associated with the billboards-of-interest.

Memory 630 may also have stored thereon other programs 640 or other data 642. The other programs 640 can include operating system programs or other applications. In some embodiments, the other data 642 may include a billboard database that is local to the mobile communication device 106, e.g., billboard database 312 in FIG. 3.

Display 646 is a display device capable of rending images, information, or other content to a user. The display 646 may be a liquid crystal display or other type of display device, and may include a touch sensitive screen capable of receiving inputs from a user's hand, stylus, or other object. Other I/O interfaces 648 may include interfaces for various other input or output devices, such as audio interfaces, physical buttons, or the like. Other computer-readable media 650 may include other types of stationary or removable computer-readable media, such as removable flash drives, or the like. Network interfaces 652 are configured to communicate with other computing devices, such as billboard server 302 via communication network 620.

One or more special-purpose computing systems are used to implement billboard server 302 to identify one or more billboards-of-interest for a user of the mobile communication device 106 and to provide information associated with those billboards to the user, as described herein. Accordingly, various embodiments described herein may be implemented in software, hardware, firmware, or in some combination thereof. The billboard server includes memory 660, processor 674, I/O interfaces 678, other computer-readable media 680, and network interface 682.

Process 674 includes one or more processing devices that execute instructions to perform actions, including at least some embodiments, described herein. In various embodiments, the processor 674 may include one or more CPUs.

Memory 660 may include one or more various types of non-volatile and/or volatile storage technologies. In some embodiments, memory 660 may employ storage technologies similar to what is described above for memory 630. Memory 660 may be utilized to store information, including computer-readable instructions that are utilized by processor 674 to perform actions, including at least some embodiments described herein.

Memory 660 may have stored thereon billboard identification system 662, which includes billboard identification module 316 and mapping module 318. The billboard-identification module 316 utilizes the location of the mobile communication device 106 to identify one or more billboards-of-interest that are within a predetermined distance from the mobile communication device's location. The mapping module 318 provides a map or other interface to the user with information associated with the billboards-of-interest. Memory 660 may also have stored thereon other programs 664, which can include operating system programs or other applications.

Memory 660 also includes a billboard database 314 that stores a list of a plurality of billboards, a location of each billboard, and other information associated with each billboard, e.g., the information that is presented on a respective billboard.

I/O interfaces 678 may include interfaces for various input or output devices, such as video interfaces, audio interfaces, physical buttons, or the like. Other computer-readable media 680 may include other types of stationary or removable computer-readable media, such as removable flash drives, external hard drives, or the like. Network interfaces 682 are configured to communicate with other computing devices, such as mobile communication device 106 via communication network 620.

The communication network 620 may be configured to couple various computing devices to transmit information or data between the computing devices. The communication network 620 includes one or more wired or wireless networks.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method comprising:
   determining, by a mobile communication device including a GPS module, a first location of the mobile communication device;
   storing, by the mobile communication device, the first location of the mobile communication device;
   receiving, by the mobile communication device executing an application, a user input indicating a billboard-information request;
   in response to receiving the billboard-information request, determining by the mobile communication device having the GPS module, a current location and a direction of travel the mobile communication device;
   determining, by the mobile communication device, a plurality of billboards located within a predetermined distance of the current location and the first location, about which information is stored;
   identifying, by the mobile communication device, from the plurality of billboards, one or more billboards of interest that faced the user based on the current location and direction travel of the mobile communication device; and
   displaying, by the mobile communication device, information regarding the one or more identified billboards.

2. The method of claim 1, wherein the displaying of the information regarding the one or more billboards includes:
   displaying, to a user of the mobile communication device, a message with the information regarding the one or more billboards.

3. The method of claim 1, wherein the displaying of the information regarding the one or more billboards includes:
   providing, to a user of the mobile communication device, a message that includes a link to a map illustrating a position of each of the identified billboards;
   in response to the user accessing the link, providing the map to the user of the mobile communication device; and
   in response to the user selecting one of the identified billboards on the map, routing the user to a website for the selected billboard.

4. The method of claim 1, wherein the displaying of the information regarding the one or more billboards includes:
   providing, to the user of the mobile communication device, a map that includes an indication of only the identified billboards that are within the predetermined distance from the current location of the mobile communication device; and
   in response to the user selecting one of the identified billboards on the map, displaying the information regarding the one or more billboards to the user.

5. The method of claim 1, further comprising:
   tracking movement of the mobile communication device prior to receiving the billboard-information request;
   determining a route traveled by the mobile communication device; and
   identifying the current location of the mobile communication device as an end-point of the determined route in response to receiving the billboard-information request.

6. The method of claim 1, further comprising:
   tracking a location of each of a plurality of mobile billboards over time;
   determining a current time when the billboard-information request is received; and
   identifying the identified billboards from the plurality of mobile billboards based on a comparison between the tracked location of each of the plurality of mobile billboards and the determined current time and current location of the mobile communication device when the billboard-information request was received.

7. The method of claim 1, further comprising:
receiving a distance from the current location of the mobile communication device as user input; and
setting the distance from the current location of the mobile device as the predetermined distance to determine the plurality of billboards.

8. The method of claim 1, further comprising:
receiving a second billboard-information request from the user of the mobile communication device;
determining a second current location of the mobile communication device when the second billboard-information request is received;
determining a second direction of travel of the mobile communication device when the second billboard-information request is received;
identifying at least one other billboard that is within the predetermined distance from the second current location of the mobile communication device and which faced the user based on the second location and the second direction of travel of the mobile communication device;
displaying a map to the user that includes icons representing each of the identified billboards and the at least one other billboard; and
in response to a user selection of at least one of the icons, displaying the information associated with a billboard represented by the selected icon.

9. The method of claim 1, wherein the user input comprises input received via a graphical user interface of the application executed on the mobile communication device.

10. The method of claim 1, wherein the user input comprises an audio input received via an audio interface of the mobile communication device.

11. A system comprising:
a mobile communication device including a GPS module and executing an application, the mobile communication device being configured to:
determine a first location of the mobile communication device;
store, the first location of the mobile communication device;
receive user input indicating a billboard-information request;
in response to receiving the billboard-information request, determine a current location and a direction of travel the mobile communication device;
determine a plurality of billboards located within a predetermined distance of the current location and the first location about which information is stored;
identify, from the plurality of billboards, one or more billboards of interest that faced the user based on the current location and direction travel of the mobile communication device; and
display information regarding the one or more identified billboards.

12. The system of claim 11, wherein the mobile communication device is further configured to:
display a map, wherein the map indicates a location of each of the identified billboards.

13. The system of claim 11, wherein the mobile communication device is further configured to:
track a location of the mobile communication device over a period of time to generate a tracked route; and
the plurality of billboards each being located within a predetermined distance from any point along the tracked route.

14. One or more instances of computer readable media not constituting a signal, collectively storing executable code configured to cause a computing system to perform a method, the method comprising:
determining a first location of a mobile communication device having a GPS module;
storing the first location of the mobile communication device;
receiving user input indicating a billboard-information request;
in response to receiving the billboard-information request, determining a current location and a direction of travel the mobile communication device;
determining a plurality of billboards located within a predetermined distance of the current location and the first location about which information is stored;
identifying from the plurality of billboards, one or more billboards of interest that faced the user based on the current location and direction travel of the mobile communication device; and
displaying, by the mobile communication device, information regarding the one or more identified billboards.

15. The one or more instances of computer readable media of claim 14, wherein the information regarding the one or more identified billboards comprises information describing content of at least one of the one or more identified billboards.

16. The one or more instances of computer readable media of claim 14, the method further comprising:
tracking a location of the mobile communication device over a period of time to generate a tracked route; and
the plurality of billboards being located within a predetermined distance from any point along the tracked route.

17. The one or more instances of computer readable media of claim 14, wherein the method further comprises:
obtaining information specifying a location of a plurality of mobile billboards over a period of time;
determining a time that the billboard information request is received;
identifying one or more mobile billboards of the plurality of mobile billboards were located within the predetermined distance of the current location and first location based on the location of the plurality of mobile billboards and the time the billboard information request is received; and
including the identified one or more mobile billboards in the plurality of billboards.

* * * * *